(12) United States Patent
Meaney et al.

(10) Patent No.: US 7,403,927 B2
(45) Date of Patent: Jul. 22, 2008

(54) METHOD OF MANUFACTURING AN ITEM OF BUILD-TO-ORDER EQUIPMENT

(75) Inventors: Roy Meaney, Ballyneety (IE); Philip Brisky, Manchaca, TX (US); Eric Hoxworth, Austin, TX (US); Joseph Tallieu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1029 days.

(21) Appl. No.: 10/764,184

(22) Filed: Jan. 23, 2004

(65) Prior Publication Data

US 2005/0165653 A1 Jul. 28, 2005

(51) Int. Cl.
*G06F 17/00* (2006.01)
*G06Q 90/00* (2006.01)

(52) U.S. Cl. .......................... 705/500; 705/7; 700/215; 700/225; 700/226; 700/227

(58) Field of Classification Search ................ 700/215, 700/225, 226, 227; 705/1, 7, 8, 500
See application file for complete search history.

(56) References Cited

U.S. PATENT DOCUMENTS

| | | | | |
|---|---|---|---|---|
| 5,311,424 A * | 5/1994 | Mukherjee et al. | ............ | 705/29 |
| 5,586,038 A * | 12/1996 | Nagaoka | ................ | 700/95 |
| 5,894,571 A | 4/1999 | O'Connor | | |
| 6,006,203 A * | 12/1999 | Ushiki | ................ | 705/29 |
| 6,161,052 A * | 12/2000 | Charlton et al. | ............... | 700/97 |
| 6,236,901 B1 | 5/2001 | Goss | | |
| 6,314,337 B1 | 11/2001 | Marcum | | |
| 6,381,509 B1 * | 4/2002 | Thiel et al. | ................ | 700/115 |
| 6,449,579 B1 | 9/2002 | Nikazm et al. | | |
| 7,073,050 B2 * | 7/2006 | Chen et al. | ................ | 713/1 |
| 2002/0091456 A1 * | 7/2002 | O'Connor | ................ | 700/97 |
| 2004/0172159 A1 * | 9/2004 | Noda et al. | ................ | 700/225 |
| 2004/0249606 A1 * | 12/2004 | Hoppes et al. | ............. | 702/183 |

FOREIGN PATENT DOCUMENTS

| | | | |
|---|---|---|---|
| EP | 0520923 A2 * | 12/1992 | |
| GB | 2353373 A | 2/2001 | |
| GB | 2353374 A | 2/2001 | |
| GB | 2357600 A | 6/2001 | |

(Continued)

OTHER PUBLICATIONS

Microsoft Press Computer Dictionary, Third Edition, Microsoft Press, Redmond, 1997, p. 95.*

(Continued)

*Primary Examiner*—Nicholas D. Rosen
(74) *Attorney, Agent, or Firm*—Haynes and Boone, LLP

(57) ABSTRACT

A method of manufacturing a build-to-order PC system unit having at least one hardware component, e.g. motherboard, bearing a unique identifier ("component ID") in software readable form. The method comprises generating a digital identifier ("system trackcode") which defines the hardware and software configuration of the item, storing the system trackcode in association with the component ID in a manufacturing database such that the component ID can be used as a key to retrieve the associated system trackcode. During manufacture the component ID is read from the motherboard and used to retrieve the associated system trackcode from the database.

10 Claims, 3 Drawing Sheets

FOREIGN PATENT DOCUMENTS

| | | |
|---|---|---|
| IE | 980486 A1 | 3/1999 |
| JP | 2003127031 A * | 5/2003 |

OTHER PUBLICATIONS

Dahlback, A., et al., "Bar Code Aids Volvo's Drive for Quality Customization" (Abstract only), ID Systems European Edition, vol. 4, No. 3, p. 20, Mar. 1996.*

Anon., "Safewww Launches Authentication System," Online Reporter, Nov. 27, 2000.*

Anon., "Upgraded Tracking Tool," Logistics Management and Distribution Report, vol. 40, No. 5, p. 83, May 2001.*

* cited by examiner

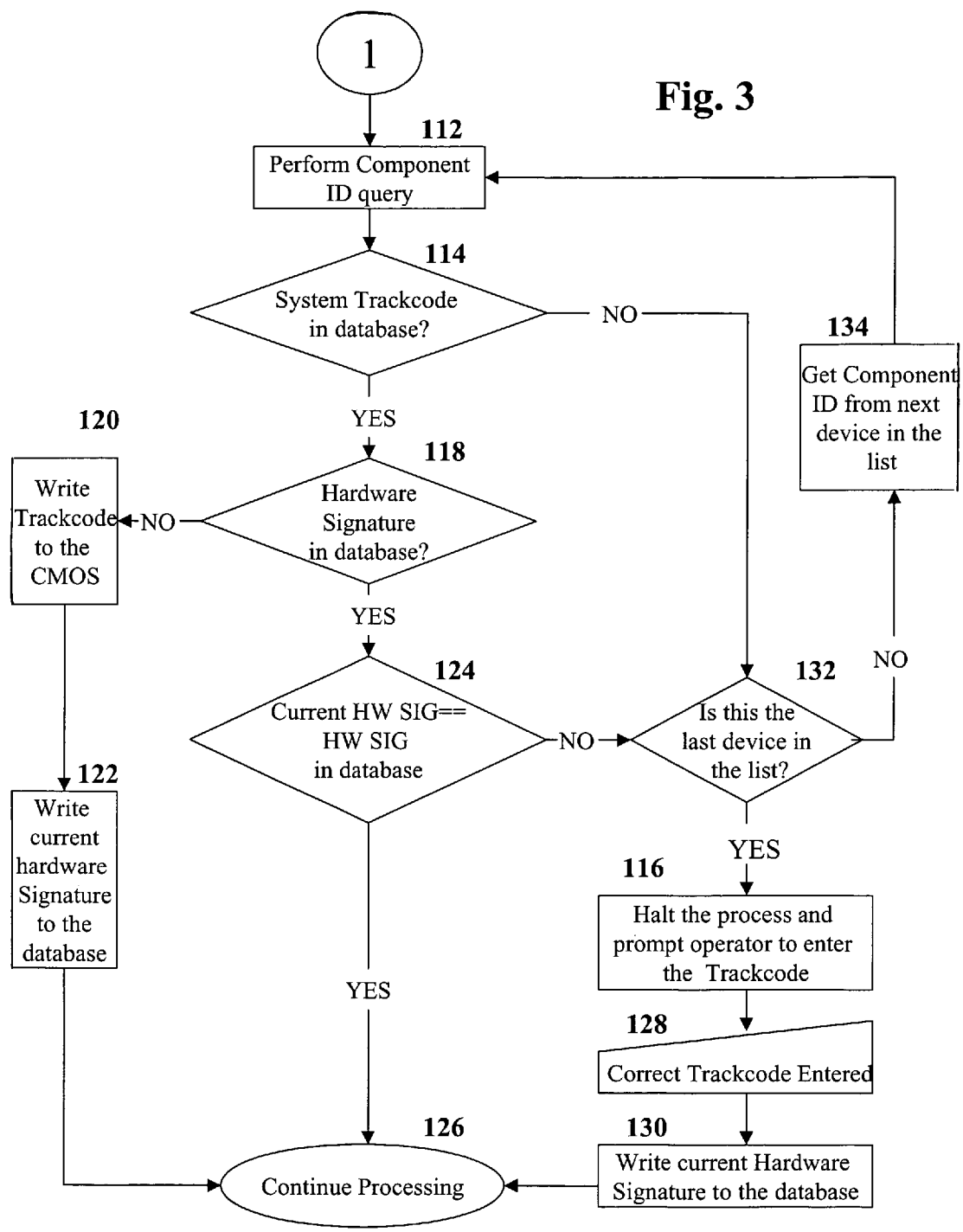

METHOD OF MANUFACTURING AN ITEM OF BUILD-TO-ORDER EQUIPMENT

BACKGROUND

This disclosure relates to a method of manufacturing an item of build-to-order equipment, especially, but not limited to, a personal computer (PC) system unit.

In a build-to-order (BTO) manufacturing process an individual PC system unit is built to a customer's hardware and software specification from a range of available options. For instance, the target system unit might include a certain brand of hard drive, a particular type of monitor, a certain brand of processor and a particular version of an operating system. Before the system unit is shipped to the customer, the selected hardware and software components are installed and tested in a series of manufacturing stages.

In a typical manufacturing process, a respective digital identifier, known as a system trackcode, provides a unique definition of the hardware and software configuration of the system unit ordered by the customer. Conventionally, the system trackcode is stored in a file located on a floppy diskette that travels with the system unit during the entire manufacturing process. However, the current trend within PC manufacturing is to eliminate the reliance on removable storage media and, in the future, many systems built by PC manufacturers will not have a floppy drive installed.

Therefore, what is needed is to provide a method of manufacturing a BTO item which does not rely on removable storage media travelling with the system unit to contain the system trackcode and, in particular, a method which allows automatic retrieval of the system trackcode at various stages of manufacture. In the present context manufacture means not simply the assembly of the hardware components but also software installation and unit testing.

SUMMARY

Accordingly, one embodiment provides a method of manufacturing an item of build-to-order equipment having at least one hardware component bearing a unique identifier ("component ID") in software readable form, the method comprising generating a digital identifier ("system trackcode") which defines the hardware and software configuration of the item, storing the system trackcode in association with the component ID in a non-specific external storage medium such that the component ID can be used as a key to retrieve the associated system trackcode, and at least at one stage of manufacture reading the component ID from one component and using it to retrieve the associated system trackcode from the external storage medium.

In the present context a "non-specific external storage medium" means a data storage medium, such as a central database, which is not individually associated with, and does not travel with, the item during manufacture.

Preferably, to avoid having to read the system trackcode from the external storage medium at each stage of manufacture, the method further includes storing the retrieved system trackcode in software readable form in a hardware component of the item. Most preferably, the hardware component in which the retrieved system trackcode is stored is the same hardware component as that bearing the component ID.

Further, to detect changes in the hardware configuration during manufacture, the method further includes generating at least at one stage of manufacture a further identifier ("hardware signature") uniquely related to a particular set of hardware components then incorporated in the item, and storing the hardware signature in association with the system trackcode in the non-specific external storage medium. In such a case, it is preferred that the method includes generating at least at one further stage of manufacture a current hardware signature and comparing the current hardware signature with the previously stored hardware signature to detect any change in hardware components between the two manufacturing stages.

The advantages of this embodiment are that it avoids the need for a removable data storage medium to accompany the item during the manufacturing process, and allows the system trackcode to be automatically retrieved at each stage of manufacture.

BRIEF DESCRIPTION OF THE DRAWINGS

FIGS. 2 and 3 are a flow diagram of manufacturing software which implements the method.

DETAILED DESCRIPTION

Figure 1:
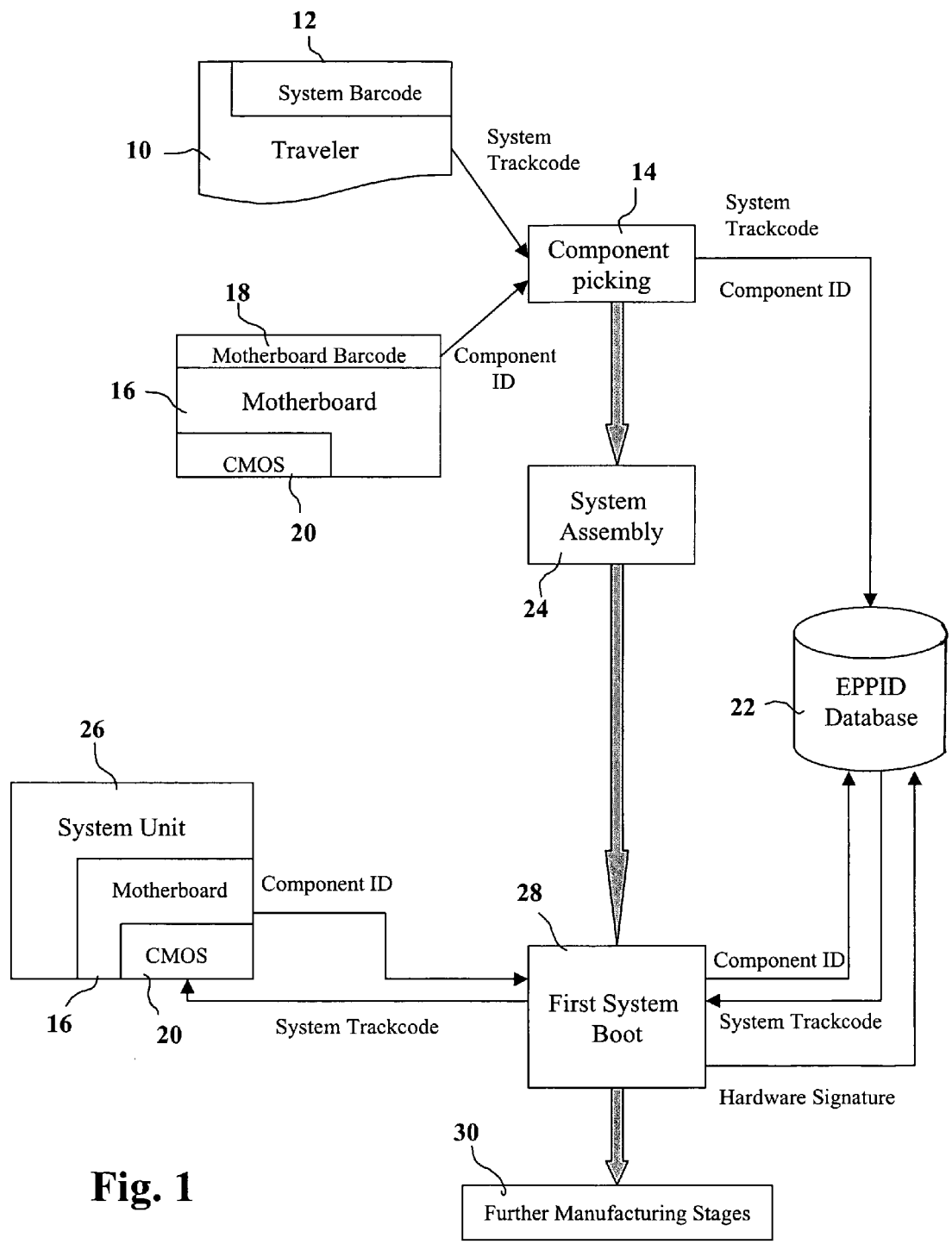
FIG. 1 is a schematic diagram of a method according to an embodiment of the invention for manufacturing a PC system unit.

Referring first to FIG. 1, when a customer places an order for a BTO system unit, a so-called traveler 10 is produced. This is a printed sheet bearing a human-readable list of the specific combination of hardware and software components which are to be incorporated in the system unit for that particular customer. The traveler 10 also has an optically readable system barcode 12 which identifies the same hardware/software configuration in coded form. During component picking 14 the barcode 12 is scanned and the resultant digital signal is used as the system trackcode for that particular BTO system unit.

Most, if not all, of the hardware components defined by the system trackcode will have a unique manufacturer's identifier, such as a serial number, herein referred to as the component ID. For example, system motherboard 16 has an optically readable barcode 18 containing a unique PPID number. The same unique PPID number is also stored in software readable form on the motherboard 16. Thus the PPID number is the component ID of the motherboard 16.

In one embodiment, during component picking 14 the motherboard barcode 18 is optically scanned to derive the component ID. Both the system trackcode derived from the traveler 10 and the component ID derived from the motherboard 16 are then stored, in association, in a central database 22 (herein called the EPPID database). This ties the system trackcode to the component ID so that for any given BTO system unit the corresponding system trackcode can be retrieved from the database 22 using the associated component ID as a key, the component ID itself being read by software from the motherboard 16.

At this point it should be mentioned that although the present embodiment uses the motherboard 16 as the source of the component ID, any hardware component to be used in the particular BTO configuration which contains a unique software readable identifier can be used. For example, hard drive manufacturers place a serial number barcode on the casing of the hard drive and this serial number is also embedded in a reserved sector on the hard drive so that it can be read via software. Such a serial number could be used as the component ID. Another possibility is the Ethernet MAC address of an on-board network interface card. In general, different hardware components could be used depending on the type of system being built.

After assembly 24, system unit 26 is powered up (first system boot) 28. At this point, manufacturing software retrieves the unit's system trackcode from the EPPID database 22 by retrieving the software readable component ID from the motherboard 16 and using it as a key to access the database. The system trackcode thus retrieved is then written to CMOS 20 on the motherboard 16. From then on, during further manufacturing stages 30, manufacturing software can read the system trackcode from the motherboard 16.

The first system boot can be initiated from a floppy disk if a floppy disk drive is present on the system unit under manufacture (although the embodiment does not require a floppy drive to be present, it does not rule it out). Alternatively, the boot can initiated from the hard disk drive or from a network, such as with a Pre-boot Execution Environment (PXE) server using basic communications software installed in the system unit. Where neither of the latter are possible, for example when RAID hardware is installed or no FAT partitions exist, boot can be initiated from a PXE server in the manner described in our copending patent application Ser. No. 10/406,462 filed Apr. 6, 2003, assigned to the assignee of the present application.

After assembly 24, system unit 26 is powered up (first system boot) 28. At this point, manufacturing software retrieves the unit's system trackcode from the EPPID database 22 by retrieving the software readable component ID from the motherboard 16 and using it as a key to access the database. The system trackcode thus retrieved is then written to CMOS 20 on the motherboard 16. From then on, during further manufacturing stages 30, manufacturing software can read the system trackcode from the motherboard 16.

The first system boot can be initiated from a floppy disk if a floppy disk drive is present on the system unit under manufacture (although the embodiment does not require a floppy drive to be present, it does not rule it out). Alternatively, the boot can initiated from the hard disk drive or from a network, such as with a Pre-boot Execution Environment (PXE) server using basic communications software installed in the system unit. Where neither of the latter are possible, for example when RAID hardware is installed or no FAT partitions exist, boot can be initiated from a PXE server in the manner described in our copending patent application Ser. No. 10/406,462 filed Apr. 6, 2003, assigned to the assignee of the present application.

A possible problem with the above process arises where hardware components are reused in manufacturing; for instance, parts returning from the strip-down process as a result of a cancelled order. Therefore it is desirable to include in the manufacturing process a method of ensuring that the manufacturing software does not retrieve the wrong system trackcode from the database 22 or from the motherboard 20.

This is achieved in the present embodiment by generating a unique identifier associated with each system trackcode, herein called the hardware signature (HW SIG). The hardware signature is a digital string uniquely related to the particular combination of hardware components incorporated in the system unit at the time the hardware signature is generated. The hardware signature may be generated by appending together a series of unique identifiers for the hardware components, such as their serial numbers, IDE device information, memory device information and installed NIC information. In general, any component-unique information that is software readable can be used.

During the first system boot, the system trackcode is retrieved from the EPPID database 22 (via the component ID lookup as described), and the current hardware signature is generated and added to the database. This ties the system unit's hardware signature to its system trackcode.

During subsequent system boots, the system trackcode is retrieved from the motherboard 16 and the current hardware signature is generated. The previously stored hardware signature is retrieved from the data base 22 using the system trackcode (or the component ID) as a key and compared against the current hardware signature. Should the current and previous hardware signatures not match, indicating some hardware change, the manufacturing process is halted.

Figure 2:
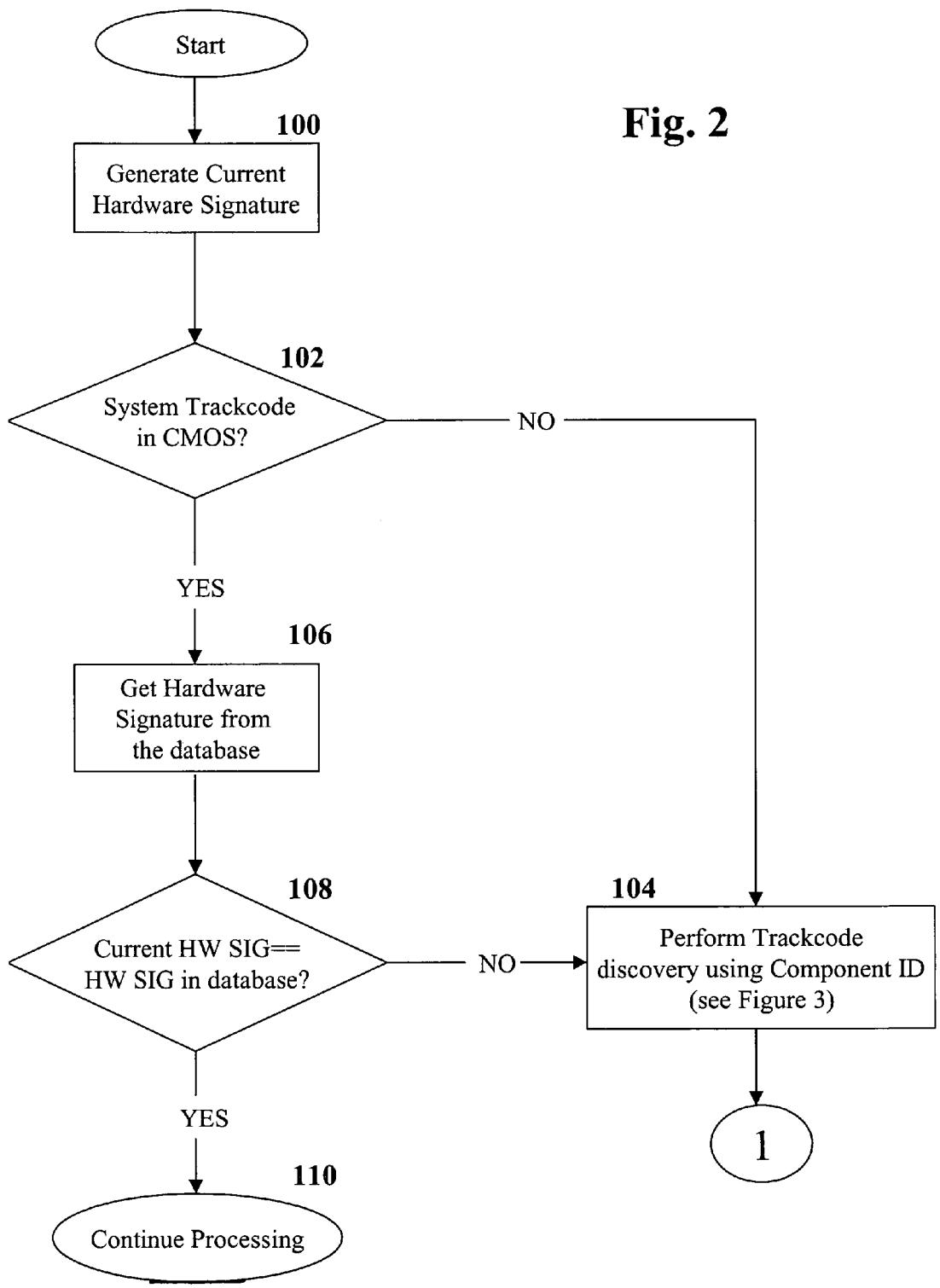

FIGS. 2 and 3 are a flow diagram of manufacturing software which is run at first and subsequent system boots.

At step 100 the current hardware signature is generated in the manner previously described. At step 102 the software attempts to read the system trackcode from the motherboard CMOS. If this is the first system boot, and the motherboard 16 has not been used previously, there will be no trackcode in the CMOS and the program moves to step 104 (FIG. 3) to retrieve the system trackcode. If, however, this is the first system boot and there is a system trackcode in the CMOS, this means that the motherboard 16 is being re-used, e.g. from a cancelled order. In that case the software reads the associated hardware signature in the database 22, step 106, and compares it at step 108, to the current hardware signature generated at step 100,. Normally the two will differ, because the CMOS trackcode normally relates to a previous order, but they may be the same if, for example, the system unit has been moved back to an earlier stage in the manufacturing process. If they are the same, the system unit moves on to subsequent manufacturing stages, step 110. If, however, the hardware signatures are different, the system trackcode in the CMOS 20 and the hardware signature in the database 22 relate to an "old" order, and once again the software moves to step 104 (FIG. 3).

FIG. 3 will first be described on the assumption that steps 132 and 134 are omitted and that the "NO" outputs of steps 114 and 124 are connected directly to step 116.

At step 112 the software interrogates the database 22, using the component ID as a key, to retrieve the system trackcode. Step 114 determines whether a system trackcode is in fact present in the database; if it is not, it means that it was not entered at component picking 14 and control passes to step 116, to be described. If there is a system trackcode in the database, step 118 interrogates the database for the associated hardware signature. If there isn't one there, this is the first system boot and steps 120 and 122 store the system trackcode in the motherboard CMOS, overwriting any "old" system trackcode, and write the current hardware signature, as determined at step 100, to the database. If there is a hardware signature in the database this is compared with the current hardware signature at step 124. If they are the same, which is unlikely, the system unit moves on to subsequent manufacturing stages, step 126. If they differ, control moves to step 116.

At step 116 the manufacturing process is halted and the operator is prompted to enter the proper system trackcode, and at step 128 this is stored both in the database 22 (in association with the component ID) and the motherboard CMOS 20. Then, step 130, the current hardware signature, as determined at step 100, is stored in the database in association with the system trackcode, or component ID, and processing continues.

As mentioned previously, the component ID can be derived from any one of several different hardware components which have a unique software readable identifier, such as a manufacturer's serial number. The embodiment described above assumes that the component ID is always derived from the motherboard 16. However, optional software steps 132 and 134 allow the process to use any one of a number of different hardware components to be used to generate the component ID, and it is not necessary for the software to know in advance which particular one is used provided it has a list of the components which could be used. Thus, if at step 114 a system trackcode cannot be found in the database associated with the motherboard component ID, the software loop 132, 134,112,114 interrogates the database using the component ID from consecutive hardware components in the list. If one is found (YES at step 118) the process proceeds as before. If, however, none is found, control passes to step 116.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of manufacturing an item of build-to-order equipment having at least one hardware component bearing a unique component ID in software readable form, comprising:

generating a digital system trackcode which defines the hardware and software configuration of the item;

storing the system trackcode in association with the component ID in a non-specific external storage medium such that the component ID can be used as a key to retrieve the associated system trackcode; and at least at one stage of manufacture reading the component ID from the one component and using it to retrieve the associated system trackcode from the external storage medium.

2. The method as claimed in claim 1, further comprising:

storing the retrieved system trackoode in software readable form in a hardware component of the item.

3. The method as claimed in claim 2, wherein the hardware component in which the retrieved system trackcode is stored in the same hardware component as that bearing the component ID.

4. The method as claimed in claim 2, further comprising:

reading the stored system trackcode from the hardware component during at least one subsequent stage of manufacture.

5. The method as claimed in claim 2, further comprising:

generating at least at one stage of manufacture a hardware signature uniquely related to a particular set of hardware components then incorporated in the item; and storing the hardware signature in association with the system trackcode in the non-specific external storage medium.

6. The method as claimed in claim 5, further comprising:

generating at least at one further stage of manufacture a current hardware signature; and comparing the current hardware signature with the previously stored hardware signature to detect any change in hardware components between the two manufacturing stages.

7. The method as claimed in claim 2, wherein the item of build-to-order equipment is a PC system unit.

8. The method as claimed in claim 7, wherein the hardware component bearing a unique identifier is the PC system unit's motherboard.

9. A method of building an information handling system (IHS) to conform to a custom order comprising:

deriving a system trackcode from a custom order;

scanning a hardware component to derive a component identifier;

associating the system trackcode with the component identifier in a database;

powering up the IHS after building the IHS;

retrieving the component identifier and the system trackcode by means of manufacturing software;

writing the system trackcode to a CMOS in the IHS;

the manufacturing software thereafter reading the system trackcode from the IHS;

generating a unique identifier (HW SIG) associated with the trackoode, retrieving the trackoode from the database;

generating a current (HW SIG) to the database;

during subseguent power ups, retrieving the trackoode and the current (HW SIG);

retrieving the unigue identifier (HW SIG) from the database using the trackcode; and comparing the unigue identifier (HW SIG) against the current (HW SIG).

10. The method claim 9, further comprising:

in the event of a mismatch between both of the (HW SIG's), halting manufacturing of the IHS.

\* \* \* \* \*